Figure 5:
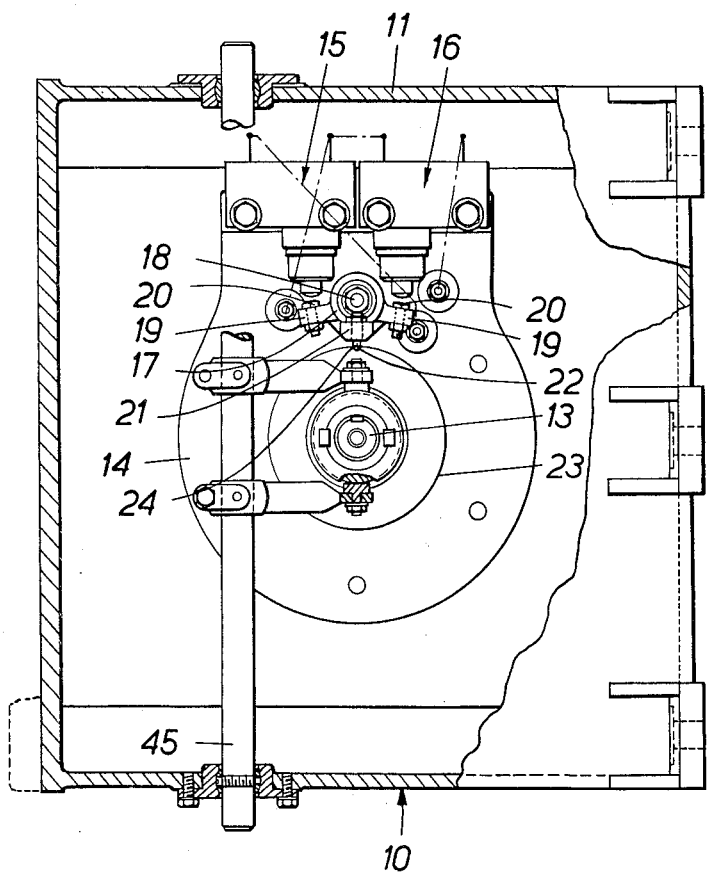

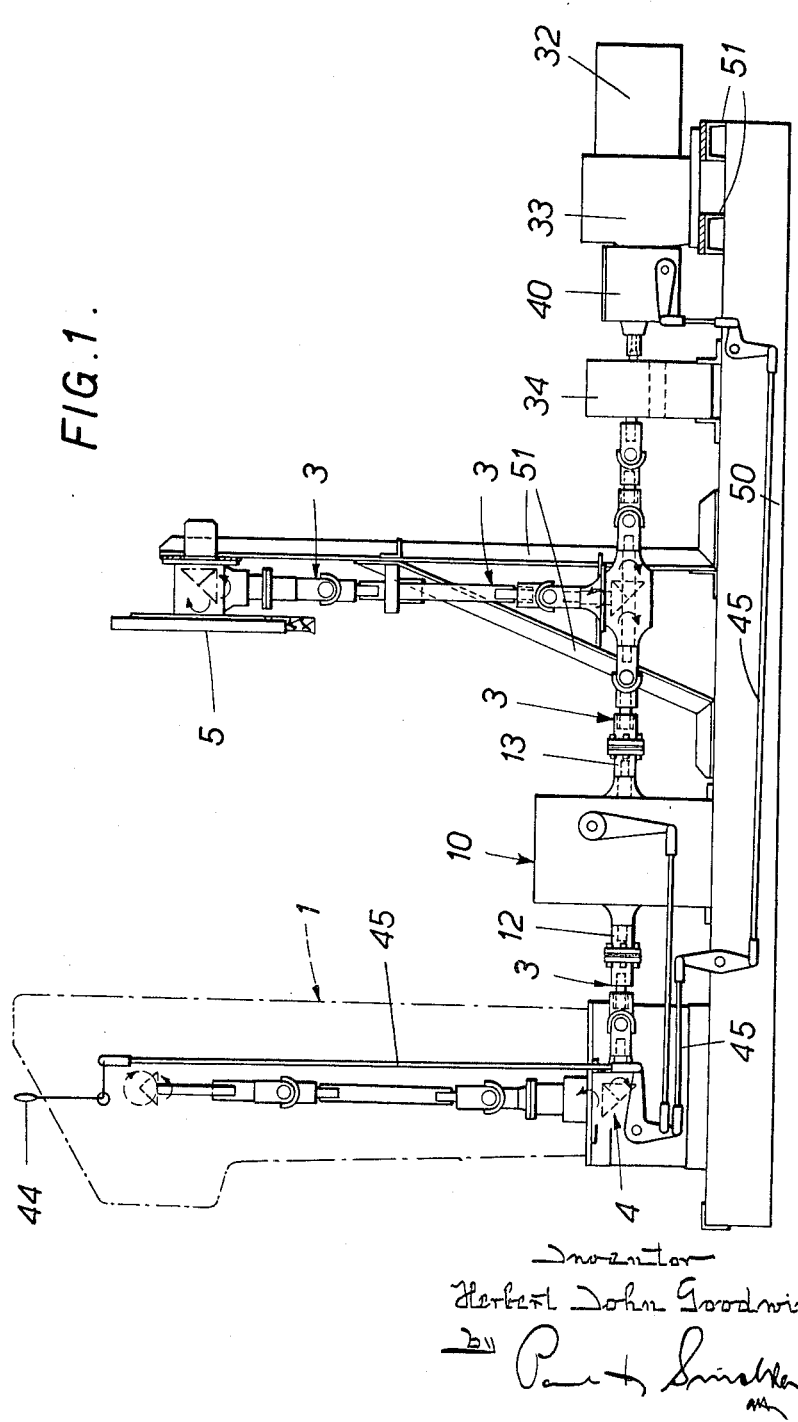

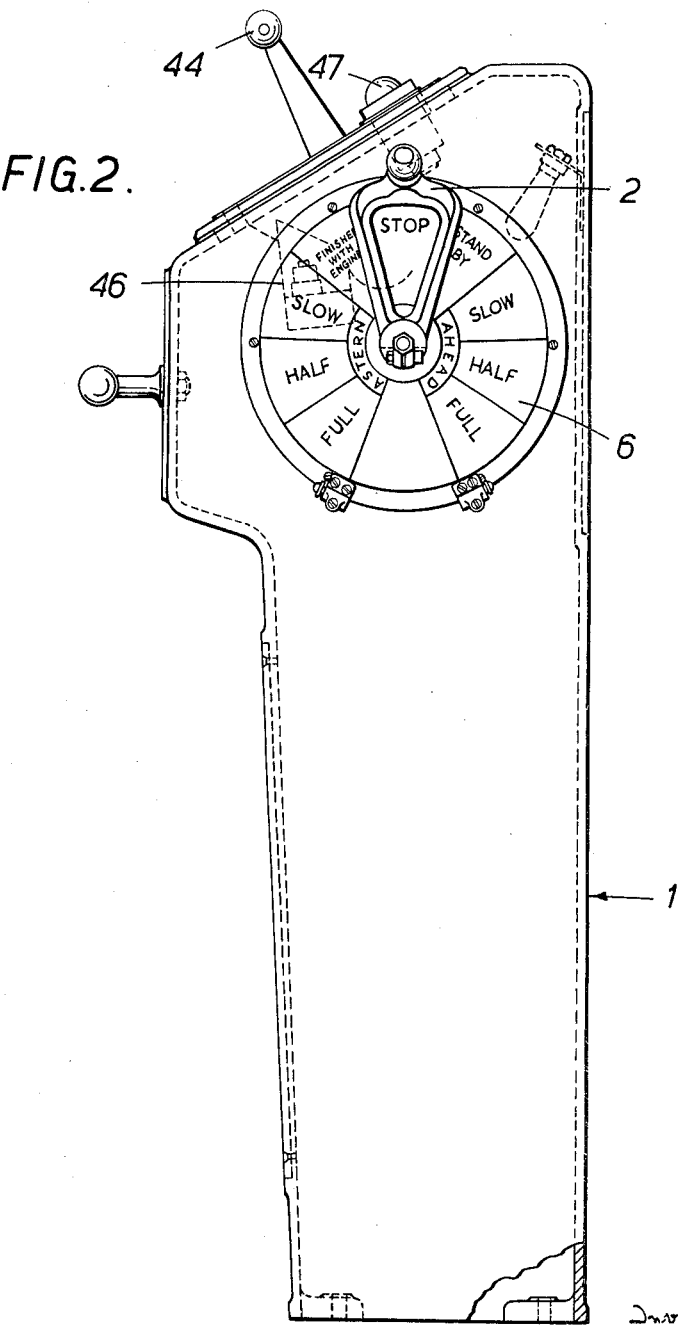

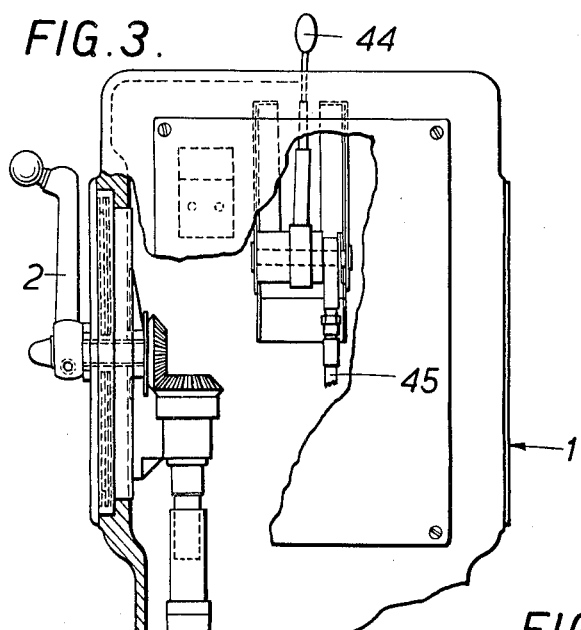
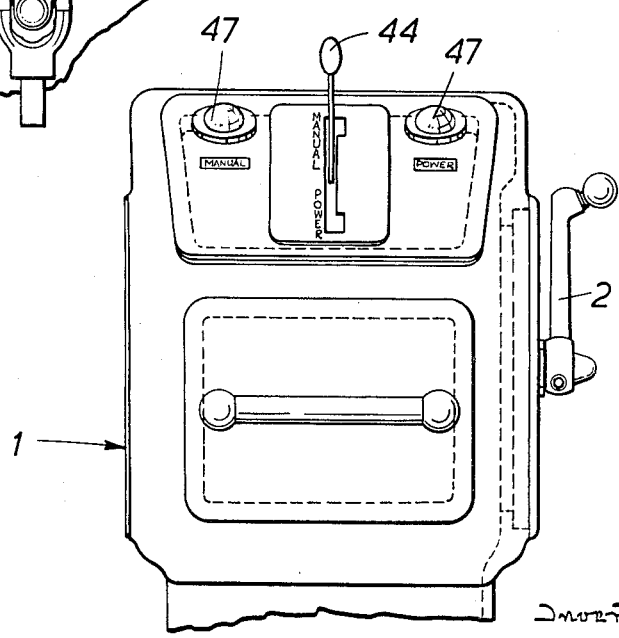

Oct. 5, 1965     H. J. GOODWIN     3,210,627
REMOTE CONTROL MEANS FOR THE CONTROL MEANS
AND/OR INDICATOR OF A PRIME MOVER
Filed Aug. 24, 1961     6 Sheets-Sheet 5

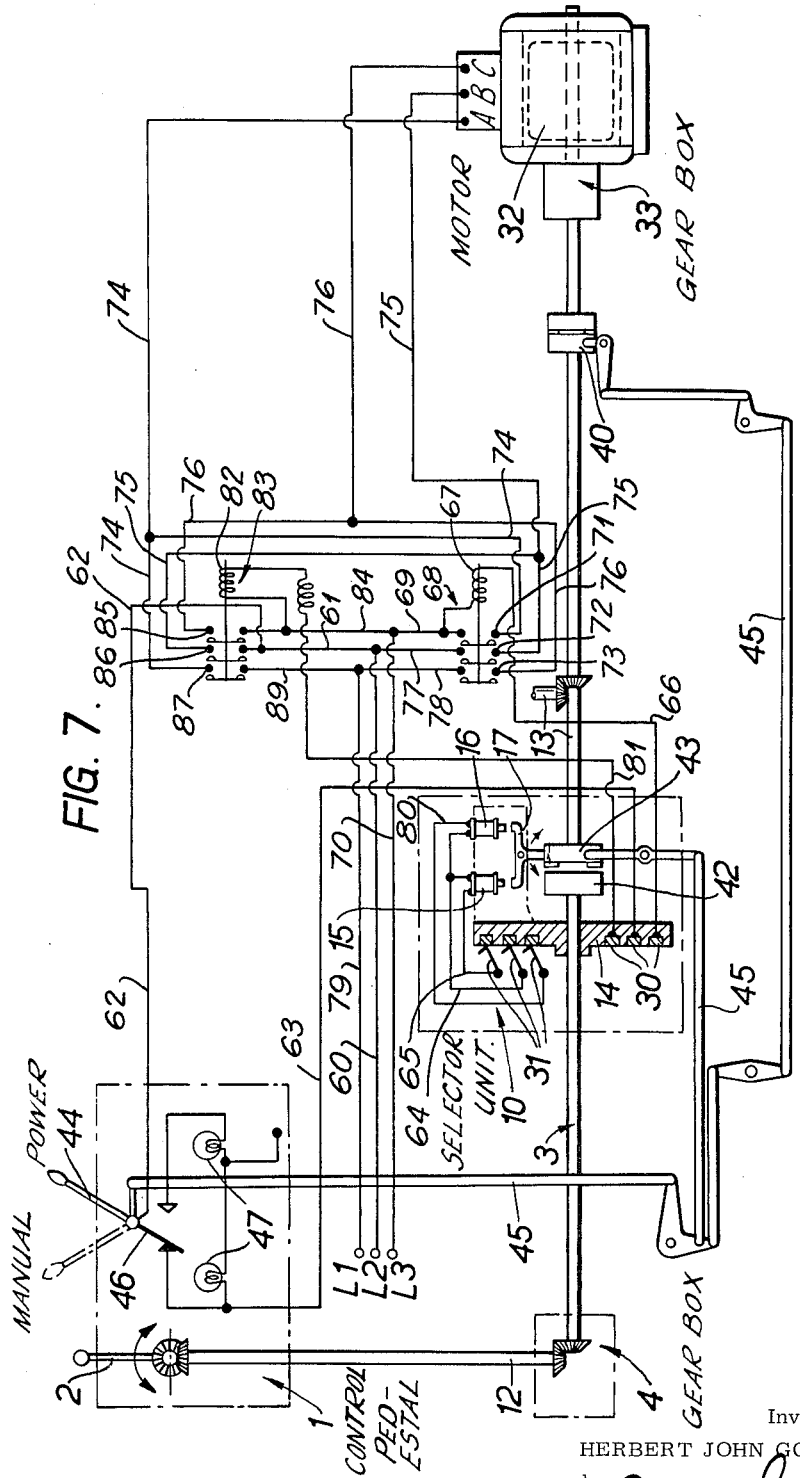
FIG. 7.
Inventor:
HERBERT JOHN GOODWIN
by 
Attorney

United States Patent Office 3,210,627
Patented Oct. 5, 1965

3,210,627
REMOTE CONTROL MEANS FOR THE CONTROL MEANS AND/OR INDICATOR OF A PRIME MOVER
Herbert J. Goodwin, Aylesbury, England, assignor to Bloctube Controls Limited, Aylesbury, England, a British company
Filed Aug. 24, 1961, Ser. No. 133,665
Claims priority, application Great Britain, Apr. 12, 1961, 13,202/61
3 Claims. (Cl. 318—31)

This invention relates to remote control apparatus of the kind in which a system of control rods or shafting is employed for transmitting movement to or indicating a required movement of a prime mover or the like from a manually operable control handle disposed at a position remote from the prime mover or the like.

The main object of this invention is to provide improved apparatus in which the effort required to move the control handle will be greatly reduced, and to this end according to this invention there is provided remote control apparatus comprising a manually operable control handle, and a system of control rods or shafting extending between such handle and a prime mover or the like and/or an indicator therefor, said system having therein near the control handle a selector unit which includes a control member operatively connected to the control handle so as always to move therewith, this member being adapted, on any movement thereof, to operate switch means thereby energising an electric motor to transmit movement to the rods or shafting between the selector unit and the prime mover or the like and/or indicator therefor, which rods or shafting are free to move independently of the control handle but are adapted to operate a follow up member in the selector unit which is movable with respect to the control member therein so as to operate said switch means again to stop the electric motor after the movement of the prime mover or the like and/or the indicator therefor, corresponding to the initial movement of the control handle, has taken place.

According to a feature of this invention the selector unit includes clutch means whereby the control member can, if desired, be directly connected to the rods or shafting between the selector unit and the prime mover or the like and/or the indicator therefor, so that direct manual control between the latter and the control handle may be established, the clutch means control being adapted on the engagement thereof to effect disengagement of further clutch means between the electric motor and said rods or shafting and vice versa.

According to a further feature of this invention the clutch means control is also adapted to operate a main electric switch arranged in the electric circuit which includes the electric motor and the switch means in the selector unit, the arrangement being such that the main switch will be closed only when the clutch means in the selector unit is disengaged and the clutch means between the electric motor and the rods or shafting is engaged. Thus the electric motor cannot be energised when there is direct manual control between the control handle and the prime mover or the like and/or the indicator therefor.

In a case where it may be desired to impart drive from the electric motor to the rods or shafting in either direction or sense, there is provided in the selector unit, in accordance with a still further feature of this invention, switch means which includes two switches which are operable separately to energise the electric motor to impart the drive in the required direction or sense. The control member in the selector unit may be adapted to cause relative rotary movement between the switch means and a cam arranged so as to close the appropriate switch as required.

Figure 6:
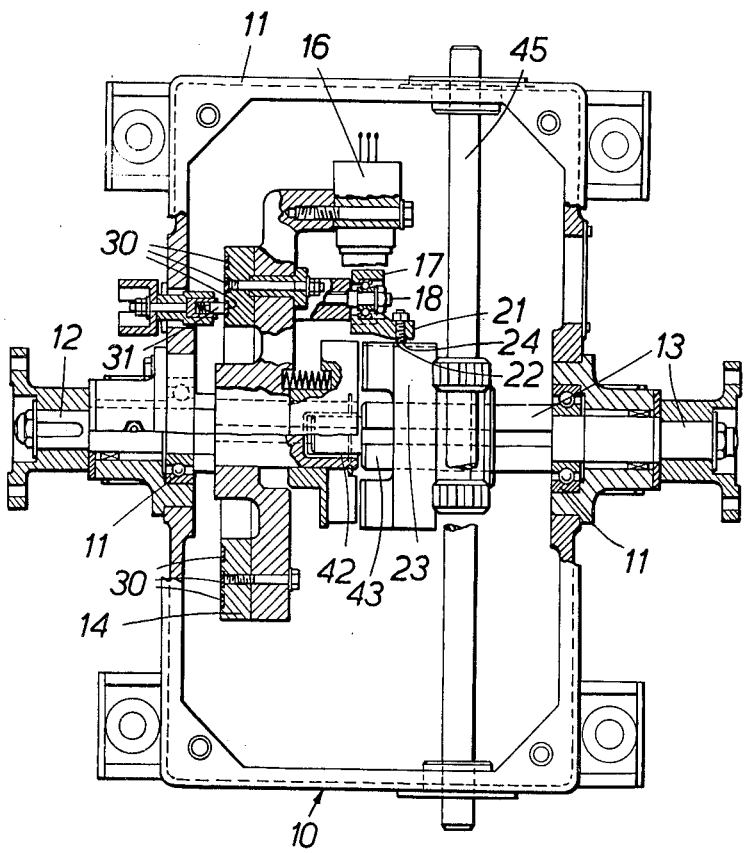

The present invention is suitable for use in a ship's telegraph equipment, and one embodiment thereof in this particular application of the invention will now be described by way of example with reference to the accompanying drawings, in which:

FIGURE 1 shows in side elevation a model arrangement incorporating the essential parts of the equipment with the present invention applied thereto, FIGURE 2 shows in side elevation, and on an enlarged scale the control pedestal as shown in FIGURE 1, FIGURE 3 is a fragmentary view showing the upper part of the control pedestal partly in rear elevation and partly in section, FIGURE 4 is a fragmentary view showing the upper pat of the control pedestal in front elevation, FIGURE 5 is a fragmentary vertical end section, also drawn on an enlarged scale, through the selector unit as shown in FIGURE 1, FIGURE 6 is a longitudinal part plan section through the selector unit with the top cover removed taken at right angles to the section shown in FIGURE 5, and FIGURE 7 is a diagram illustrating the electric wiring provided in the equipment in accordance with the present invention.

A ship's telegraph equipment comprises broadly a control pedestal 1 which would be disposed on the ship's bridge or in some other equivalent position, in which pedestal a main control handle 2 is arranged, and a system of rods or shafting 3 which extends from the pedestal through a bevel gear box 4 down to the engine room where there can be direct connection to the ship's engine or, as shown, indicator means 5 therefor, or to both. The pedestal 1 and indicator means 5 in the engine room include indicator dials 6 for indicating "Stop" and speeds "Ahead" and "Astern." Where there is direct connection to the ship's engine there may be no indicator means in the engine room, but it may equally well be arranged that such indicator means are provided in conjunction with isolator means whereby the direct connection to the engine may be broken, movements shown on the dial of the indicator means then being applied manually to the engine.

In the application of the present invention, a selector unit indicated generally by the reference numeral 10 in FIGURE 1 is disposed near the control pedestal 1, this unit comprising a box 11 (FIGURES 5 and 6) having in two opposite sides thereof journals 11 for two coextending rods 12, 13 of the aforesaid system of rods or shafting 3. The first of these rods 12 is directly subject to any movement of the control handle 2 of the pedestal, but, except as explained hereinafter, there is no direct driving connection between this rod and the second rod 13, the latter being, however, in direct driving connection with the remainder of the system of rods and shafting down to the engine room.

The first rod 12 has fixedly secured thereto, inside the box 11 of the selector unit, a ring-like member 14, which forms a switch carrier assembly, this member being extended on one side and having mounted thereon two electric micro-switches 15, 16. Also mounted on this member is a carrier member 17 which is rockable about a central pivot 18 to each side of which extends an arm 19 carrying a contact making element 20, the arrangement being such that on rocking the carrier member 17 in either direction one or other of the micro-switches 15 or 16 will be caused to close by the respective contact making element 20. The carrier member 17 also has a finger 21 which extends forwardly parallel to the axis about which the ring-like member 14 rotates, and has in the free end thereof a stud 22 directed inwardly towards such axis. This stud 22 engages a circular cam 23 fixedly secured to the end of the second rod 13 coaxially with the ring-like member 14 and having in the periphery thereof a recess 24 in which the stud 22 is received when the ring-like member 14 is in its rest position (as shown). On the rotation of the ring-like member 14 in either direction, however, the stud 22 is drawn out of the recess 24 whereby the carrier member 17 will be caused to rock to effect closure of one or other of the micro-switches 15 or 16.

The micro-switches are arranged in electric circuits, which includes suitable slip rings 30 and brushes 31 on or in the ring-like member 14 and box 11 of the selector unit respectively, and a power supply, that is an electric motor 32 (FIGURE 1) which, through the intermediary of appropriate gearing 33 is adapted to impart drive to the rods or shafting between the selector unit 10 and the ship's engine and/or indicator means 5 therefor. The aforesaid second shaft 13 and the cam 23 thereon will also be driven or rotated, and in effect the cam 23 forms a follow-up member for the ring-like member 14 in that it is rotated in the same direction or sense until the stud 22 of the carrier member re-engages in the recess 24 in the cam, opening the micro-switch 15 or 16 and stopping the electric motor 32.

It will readily be apparent that only small effort will be required to move the control handle 2 of the pedestal 1, in either direction, since this only has to move the ring like member 14 and the intervening rods or shafting. The main effort is taken by the electric motor 32. Naturally, it is arranged that when the motor 32 stops it has translated to the ship's engine and/or the indicator means 5 therefor a movement exactly equivalent to that made by the control handle 2.

To obtain the required time cycle or operation from, say, "Full Ahead" to "Full Astern" a slow motion operation of the control is achieved by means of a worm or spur gear reduction ratio gear or a combination of both in a further gear box 34. The gearing can be so arranged to give any desired time factor, for example seven seconds. This ensures that engine speed is reduced to a minimum before engaging "Ahead" or "Astern" gear clutches, thus reducing wear on clutch faces to a minimum and reducing torsional stresses throughout the system.

To allow for the possibility of failure of the power supply, drive therefrom to the rods or shafting is through a disengageable clutch 40, and to allow then for subsequent direct manual control from the control handle 2 to the ship's engine and/or indicator means 5 therefor, a second clutch 41 is incorporated in the selector unit 10 (see FIGURE 6), a female clutch element 42 conveniently being included on the ring like member 14 and a male clutch element 43 on the face of the cam 23. Common control means for the two clutches is provided so that on engagement of one the other is automatically disengaged. A control handle 44 for such means is included in the control pedestal 1 wtih appropriately arranged link rods 45 for operating the two clutches together. The control handle 44 is also arranged to operate a main electric switch 46 included in the circuit to the electric motor 32 so that the latter cannot possibly be driven when direct manual control is being used. Indicator lights 47 may be provided to show whether the clutch for direct manual control or electric motor assisted control is in engagement.

In FIGURE 1 the parts as described above are shown in a "model arrangement" mounted on a pedestal 50 wtih suitable fixed bracket 51 thereon. This is purely for convenience, and it will be understood that in practice the parts will be widely dispersed, the system of rods and shafting 3 being much more extensive.

The two operative electric circuits shown in FIG. 7 will now be traced:

Commencing wtih terminal L2 the common elements of the two circuits comprise leads 60, 61 and 62 to the main electric switch 46, lead 63 from this switch to the central slip ring 30 in the member 14 and its associated brush 31, and a lead 64 to the two micro-switches 15 and 16. The indicator lights 47 are connected in parallel with the lead 63.

For the first circuit the micro-switch 15 will be operated. This completes the circuit through lead 65 and a brush 31 to the outermost slip ring 30 in the member 14, through a lead 66 to the coil 67 of relay 68 and so through leads 69 and 70 to terminal L3.

The contacts 71, 72 and 73 of the relay 68 are caused to close, being respectively connected by leads 74, 75 and 76 to the terminals A, B and C of the electric motor 32. The contact 71 is also connected to lead 69 and so through lead 70 to the terminal L3. The contact 72 is also connected to lead 77 and so through lead 60 to terminal L2. The contact 73 is also connected to lead 78 and so through lead 79 to terminal L1. The motor 32 will thus be caused to rotate in one direction.

For the second circuit the micro-switch 16 will be operated. This completes the circuit through lead 80 and a brush 31 to the innermost slip ring 30 in the member 14, through a lead 81 to the coil 82 of relay 83 and so through leads 84 and 70 to terminal L3.

The contacts 85, 86 and 87 of the relay 83 are caused to close, being respectively connected by leads 76, 75 and 74 to the terminals C, B and A of the electric motor 32. The contact 85 is also connected to lead 84 and so through lead 70 to the terminal L3. The contact 86 is also connected to lead 61 and so through lead 60 to terminal L2. The contact 87 is also connected to lead 89 and so through lead 79 to terminal L1. The motor 32 will thus be caused to rotate in the opposite direction.

Although only one embodiment of my invention has been shown and described by way of illustration, it will be understood that my invention may be differently embodied within the scope of the appended claims.

I claim:

1. Remote control apparatus for the control means of a prime mover, and for a remote indicator for such prime mover, said remote control apparatus comprising in combination, a manually operable control element; a selector unit adjacent said control element, said selector unit comprising a control member; a follow-up member movable relative to said control member, normally disengaged first clutch means comprising interengageable clutch components on said control member and said follow-up member, normally engaged second clutch means and a manually operable clutch control mechanism selectively operable conjointly to engage said first clutch means and to disengage said second clutch means; first mechanical transmission means interconnecting said control element and said control member for movement of said control member in synchronism with the movement of said control element; an electric motor; second mechanical transmission connecting said motor to said control means, to said remote indicator, and to said follow-up member for synchronized operation of said control means and said indicator and said follow-up member, said normally engaged second clutch means connecting said motor to said second transmission means; switch means supported by said control member and controlling energization of said electric motor; and cam means movable with said follow-up member and engaged with operating means for said switch means; said cam means, through said operating means, being operable, responsive to relative displacement of said control member and said follow-up member and said control means, and said indicator to follow the movements of said control member and said indicator; said cam means, responsive to reattainment of a predetermined relative orientation of said control member and said follow-up member, activating said operating means to deenergize said motor.

2. Remote control apparatus, as defined in claim 1, including a main electric switch connected the supply circuit for said switch means and said electric motor; and means operable, responsive to operation of said clutch control mechanism to engage the first clutch means and disengage said second clutch means, to open said main electric switch.

3. Remote control apparatus as defined in claim 1 in which said clutch control mechanism includes an operating lever mounted adjacent said control element, and linkage interconnecting said operation lever with said first clutch means and said second clutch means.

References Cited by the Examiner

UNITED STATES PATENTS

| | | | |
|---|---|---|---|
| 2,412,605 | 12/46 | Drake | 318—31 |
| 2,440,255 | 4/48 | Drake | 318—31 |
| 2,913,655 | 11/59 | O'Neill | 318—31 |
| 2,923,874 | 2/60 | Bell | 318—31 |

JOHN F. COUCH, *Primary Examiner.*

MILTON O. HIRSHFIELD, *Examiner.*